Nov. 18, 1930.  O. U. HOFMANN  1,782,234
METHOD OF WELDING AND THE RESULTANT PRODUCT
Filed Dec. 31, 1928
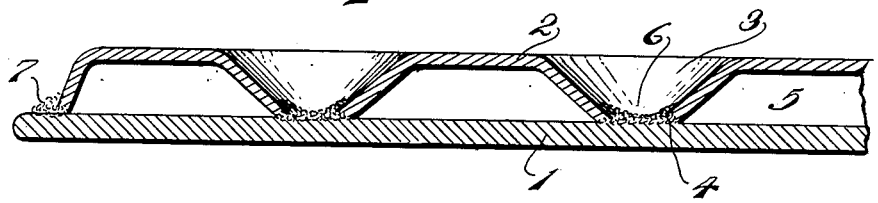
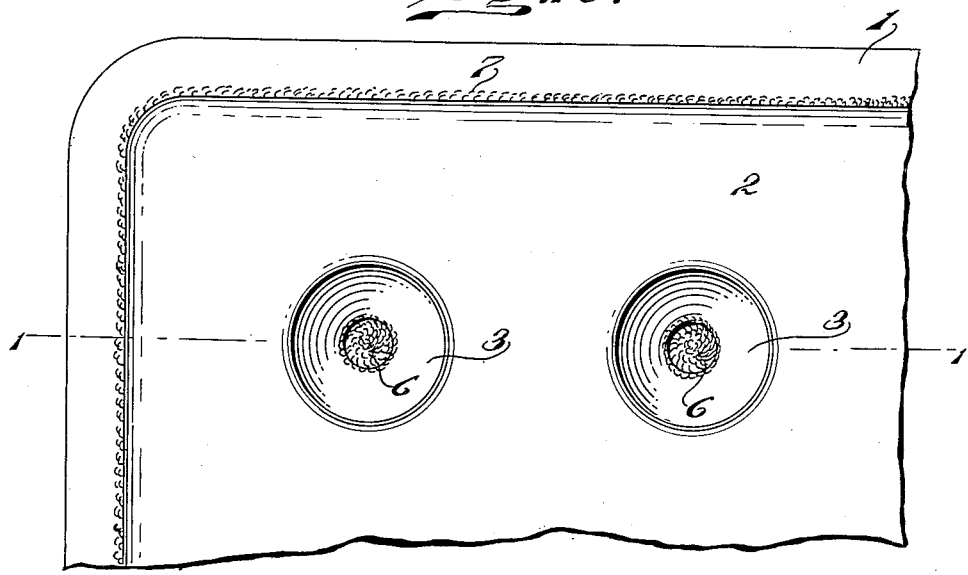
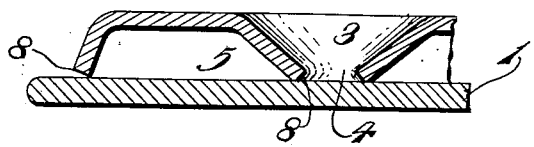
INVENTOR
Otto U. Hofmann
BY
Herbert S. Fairbanks
ATTORNEY Patented Nov. 18, 1930

1,782,234

UNITED STATES PATENT OFFICE

OTTO U. HOFMANN, OF PHILADELPHIA, PENNSYLVANIA

METHOD OF WELDING AND THE RESULTANT PRODUCT

Application filed December 31, 1928. Serial No. 329,411.

My present invention relates to a novel method of welding and the novel weld resulting from carrying out such method.

My present invention is especially applicable for the uniting of a backing plate with the press plate of a steam buck used in pressing machines in order to obtain a steam tight chamber although as is apparent, my invention is not limited to the method of manufacturing a specific article but can be used in a great many cases arising in practice where a steam or fluid tight joint is desired between juxtaposed parts.

In devices of this character as heretofore manufactured, it has been customary to employ sheet metal plates which are spaced from each other by means of shouldered rivets the heads of which are received in counter-sunk depressions in the plates surrounding the rivets and the heads of such rivets are then welded in place.

This method is not only expensive but it has been found to be extremely difficult to uniformly make a weld around the heads of the rivets which will remain steam tight.

Furthermore, when the pressing surface of the plate is polished any defects in the welds will be visible and it is difficult to obtain a uniform pressing surface.

One of the objects of this invention is to overcome the objections heretofore present in the welding together of sheet material to form a steam or fluid tight chest. To this end I dispense with the rivets or separate members heretofore employed and form cup shaped or conical shaped depressions in one plate leading to apertures through such plate and I then fill in the bottom of each aperture with welding material which preferably extends under the inclined walls surrounding the apertures and fills in the space encompassed by such walls so that the weld is united with the back face of the member such as, for example, a press plate, and completely fills the bottom portion of the depressions.

The outer wall of the backing plate has its marginal portion bent inwardly so that a preferably inclined wall is provided so that the space thus formed is filled in with the welding composition and the welding composition also extends a desired distance along the juxtaposed outer wall of the backing member and the inner wall of the press plate.

With the above in view my invention comprehends a novel methol of welding and a novel weld resulting from such method.

It further comprehends a novel method of welding wherein a backing member is provided with a desired number of apertures and the surrounding walls of these apertures are then bent inwardly to define the width of the steam chest which is to be formed. The marginal portion is also bent inwardly to the same extent as the walls surrounding the apertures, and the marginal portion is then welded to the press plate and the openings through the press plate, and the surrounding walls of the depressions or pockets are filled with the welding material.

It further comprehends a novel press plate for a steam buck wherein a backing member is secured to the rear wall of the press plate to form therewith a steam chest.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a section on line 1—1 of Figure 2 of a press plate for a steam buck constructed in accordance with my present invention.

Figure 2 is a bottom plan view of a portion of the press plate.

Figure 3 is a section similar to Figure 1 showing the parts in position for welding but prior to the welding operation.

Similar numerals of reference indicate corresponding parts.

Referring to the drawings:—

In order to illustrate one manner of carrying out my invention in practice, I have preferred to illustrate it in the form of a press plate for steam bucks wherein the parts are united and the steam chest is formed in accordance with this invention.

1 designates the press plate which is of the usual construction and consists of a flat plate of sheet metal. 2 designates the back plate which is provided with the depressions or pockets 3 having the openings 4 through their bottoms. 5 is the steam chamber formed between the press plate and the back plate. 6 designates the weld in the depressions or pockets, and 7 designates the weld surrounding the outer wall of the back plate.

It will be noted that the marginal portion of the back plate is inwardly or laterally deflected to the same extent as is the walls surrounding the pockets 3.

The openings 4 are preferably formed when the back plate is cut to size so that when the marginal portion has been shaped and the pockets formed then the wall juxtaposed to the press plate will be angularly inclined as indicated at 8. The back plate 2 after being formed as before explained is brought into contact with the rear wall of the press plate 1 and the welding material is then inserted in the bottom of the pockets 3 and the welding operation completed.

In a similar manner the marginal portion of the back plate 2 is welded to the rear wall of the press plate 1.

Special attention is directed to the weld formed in the pockets it being seen that the welding material is united to the rear wall of the press plate over a considerable area and extends between the inclined walls 8 and the press plate and also fills to any desired extent the pockets 3.

In this manner a steam chamber can be formed which will always be retained in a fluid or steam tight condition so that leakage will not occur.

The back plate may be of any desired thickness and if desired can be made thinner than the press plate.

In accordance with my present invention, a steam chest can be economically formed which will be lighter in weight than those heretofore used and a much stronger weld is provided for securing the members to be welded together.

While I have illustrated this invention as especially adapted to be employed in the manufacture of steam buck press plates, it will be apparent that its use is not limited to such an article and it is capable of employment in welding together different members with a space therebetween irrespective of the contour of such members.

Where a flat plate like a press plate is employed the width of the steam chest will be defined by the depth of the pockets and the extent to which the marginal portion of the back member is deflected. In some types of construction, where it is not necessary to have a flat surface for one of the members, each of the members may be deflected throughout the area of the steam chest to increase the width of the steam chest.

My present invention is adapted to be employed in uniting two different parts and is of special value where a fluid tight chamber is to be formed between the parts. The invention is not limited to use with flat members and they may be rounded as in border construction or they may be of any desired contour.

It will now be apparent that I have devised a new and useful method of welding and the resultant product which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. The herein described press plate for a steam buck comprising a flat press plate, a flat back plate having its marginal wall deflected beyond its outer wall and welded to the rear wall of said press plate, said back plate having depressions with openings in the bottoms of the depressions, and welding material filling the bottoms of said openings to form a steam tight union of the juxtaposed walls of said depressions and the rear wall of said press plate.

2. The method of welding two plates together, which consists in forming one plate with depressions throughout its area, extending beyond the opposite wall and with its outer marginal wall deflected in the same direction, the depressions being formed with openings in their bottoms, assembling such plate against the second plate so that the depth of the marginal wall and depressions determines the width of the steam chamber, welding the deflected marginal portion of one plate to the second plate, and welding the inner walls of the depressions of one plate to the second plate, with the weld filling the bottoms of the openings through said depressions.

3. The herein described press plate for a steam buck, comprising a flat press plate, a flat back plate having its marginal wall deflected and welded to the rear wall of the press plate, said back plate having throughout its area depressions extending towards the back plate provided with openings, the deflection of the marginal portion of the back plate and the depth of the depressions determining the width of the chamber formed, and welding material filling the bottoms of the openings in the depressions to form a steam tight union with the back plate.

OTTO U. HOFMANN.